United States Patent
Pietrangelo et al.

(10) Patent No.: US 10,669,378 B2
(45) Date of Patent: Jun. 2, 2020

(54) POLY(THIOETHERS) FOR METAL ION SEQUESTRATION

(71) Applicant: Rutgers, The State University of New Jersey, New Brunswick, NJ (US)

(72) Inventors: Agostino Pietrangelo, New Brunswick, NJ (US); Anshuman Mangalum, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 16/094,844

(22) PCT Filed: Apr. 24, 2017

(86) PCT No.: PCT/US2017/029161
§ 371 (c)(1),
(2) Date: Oct. 18, 2018

(87) PCT Pub. No.: WO2017/185092
PCT Pub. Date: Oct. 26, 2017

(65) Prior Publication Data
US 2019/0144608 A1 May 16, 2019

Related U.S. Application Data

(60) Provisional application No. 62/326,414, filed on Apr. 22, 2016.

(51) Int. Cl.
*C08G 75/02* (2016.01)
*C08G 85/00* (2006.01)
(Continued)

(52) U.S. Cl.
CPC .............. *C08G 75/02* (2013.01); *C02F 1/683* (2013.01); *C08G 75/06* (2013.01); *C08G 75/10* (2013.01);
(Continued)

(58) Field of Classification Search
CPC ........ C08G 75/02; C08G 75/06; C08G 75/10; C08G 85/004; C08L 81/02; C08L 81/04;
(Continued)

(56) References Cited

U.S. PATENT DOCUMENTS

| 4,157,971 A | 6/1979 | Yaffe et al. |
| 2014/0049823 A1 | 2/2014 | Grubbs et al. |

FOREIGN PATENT DOCUMENTS

| KR | 20100118542 A | 11/2010 |
| WO | 2000061288 A1 | 10/2000 |

(Continued)

OTHER PUBLICATIONS

Alexandratos, S , et al., "Synthesis and Ion-Binding Affinities of Calix[4]arenes Immobilized on Cross-Linked Polystyrene", Macromolecules 34, 206-210 (2001).
(Continued)

*Primary Examiner* — Shane Fang
(74) *Attorney, Agent, or Firm* — Viksnins Harris Padys Malen LLP

(57) ABSTRACT

The invention provides a polymer comprising two or more residues of formula III or IV or salts thereof: wherein dash line, X, Y, Q, L, M, n, $R^1$, $R^2$, $R^a$, $R^b$, $R^c$ and $R^d$ have any of the values defined in the specification, as well as synthetic intermediates and synthetic methods useful for preparing the (Continued)

compounds. The polymer is useful to treat contaminated water by chelating metal.

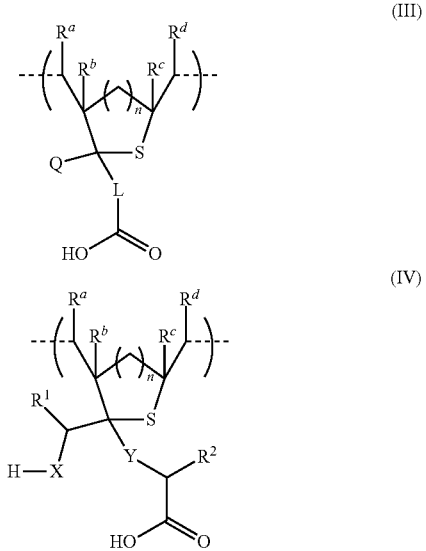

15 Claims, 3 Drawing Sheets (51) Int. Cl.
   C08L 81/02        (2006.01)
   C02F 1/68         (2006.01)
   C08L 81/04        (2006.01)
   C08G 75/06        (2006.01)
   C08G 75/10        (2006.01)
   C02F 101/22       (2006.01)
   B01J 31/22        (2006.01)
   C02F 101/20       (2006.01)

(52) U.S. Cl.
   CPC ............ C08G 85/004 (2013.01); C08L 81/02
         (2013.01); C08L 81/04 (2013.01); B01J
         31/2278 (2013.01); C02F 2101/206 (2013.01);
                           C02F 2101/22 (2013.01)

(58) Field of Classification Search
   CPC .................. C02F 1/683; C02F 2101/22; C02F
                        2101/206; B01J 31/2278
   See application file for complete search history.

(56) References Cited

FOREIGN PATENT DOCUMENTS

WO    2000073782 A1    12/2000
WO    2017185092 A1    10/2017
WO    2019060433 A1     3/2019

OTHER PUBLICATIONS

Bell, C., et al., "Surface-Functionalized Polymer Nanoparticles for Selective Sequestering of Heavy Metals", Adv Mater 18, 582-586 (2006).
Buchmeiser, M., "Metathesis-Based Polymers for Organic Synthesis and Catalysis", Polymeric Materials in Organic Synthesis and Catalysis 8, 345-370 (2003).
Buchmeiser, M., et al., "Ring-Opening Metathesis Polymerization for the Preparation of Surface-Grafted Polymer Supports", Macromolecules 33, 32-39 (2000).
Elimelech, M., et al., "The future of seawater desalination: energy, technology, and the environment", Science (6043), 712-717 (2011).
Geckeler, K., et al., "Interactions of polymer backbones and complexation of polychelatogens with methylthiourea ligands in aqueous solution", Angew Makromol Chem 155, 151-161 (1987).
Hartono, M., et al., "Use of Bamboo PowderWaste for Removal of Bisphenol A in Aqueous Solution", Water Air Soil Pollut 226, 386 (2015).
Jarup, L., et al., "Hazards of heavy metal contamination", Br Med Bull 68, 167-182 (2003).
Mangalum, A., et al., "A Pb2+-binding polychelatogen derived from thionated lactide", RSC Advances 6(78), 74250-74253 (2016).
Mayr, B., et al., "Influences of surface chemistry on the separation behavior of stationary phases for reversed-phase and ion-exchange chromatography: a comparison of coated and grafted supports prepared by ring-opening metathesis polymerization", Journal of Chromatography A, 907, 73-80 (2001).
Patent Cooperation Treaty, International Searching Authority, Search Report and Written Opinion for PCT/US2017/029161, 10 pages, dated Jul. 20, 2017.
Pubchem, Substance Record for SID 278661529, http://pubchem.ncbi.nlm.nih.gov/substance/278661529, 6 pages (Jan. 12, 2016).
Ramirez, E., et al., "Use of pH-sensitive polymer hydrogels in lead removal from aqueous solution", J Hazard Mater 192, 432-439 (2011).
Rivas, B., et al., "Poly(2-acrylamido glycolic acid): A water-soluble polymer with ability to interact with metal ions in homogenous phase", Inorg Chem Commun 10, 151-154 (2007).
Shannon, M., et al., "Science and technology for water purification in the coming decades", Nature 452, 301-310 (2008).
Sinner, F., et al., "Ring-Opening Metathesis Polymerization: Access to a New Class of Functionalized, Monolithic Stationary Phases for Liquid Chromatography", Angewandte Chemie International Edition 39(8), 1433-1436 (2000).
Spivakov, B., et al., "Liquid-phase polymer-based retention—the separation of metals by ultrafiltration on polychelatogens", Nature 315, 313-315 (1985).
Sylvain, C., et al., "Efficient procedure for the preparation of (vinyl)polystyrene resin", Tetrahedron Letters 39, 9679-9680 (1998).
Tomida, T., et al., "Binding Properties of a Water-Soluble Chelating Polymer with Divalent Metal Ions Measured by Ultrafiltration. Poly(acrylic acid)", Ind Eng Chem Res 40, 3557-3562 (2001).
Tulu, M., et al., "Dendritic polychelatogens: Synthesis, characterization, and metal ion binding properties", Appl Polym Sci 109, 2808-2814 (2008).
Wathier, M., et al., "A Large-Molecular-Weight Polyanion, Synthesized via Ring-Opening Metathesis Polymerization, as a Lubricant for Human Articular Cartilage", Journal of American Chemical Society 135(13), 4930-4933 (2013).

POLY(THIOETHERS) FOR METAL ION SEQUESTRATION

CROSS-REFERENCE TO RELATED APPLICATIONS

This application claims priority to U.S. Provisional Application No. 62/326,414, filed Apr. 22, 2016. The entire content of the application referenced above is hereby incorporated by reference herein.

BACKGROUND OF THE INVENTION

Polychelatogens (Spivakov, B. Y., et al., *Nature* 1985, 315, 313-315; Geckeler, K. E., et al., *Angew. Makromol. Chem.* 1987, 155, 151-161; and Tülü, M., et al., *Appl. Polym. Sci.* 2008, 109, 2808-2814) and their heterogeneous (i.e. water-insoluble) alternatives (Alexandratos, S. D., et al., *New. J. Chem.* 2015, 39, 5366-5373; Alexandratos, S. D., et al., *Macromolecules* 2001, 34, 206-210; Bell, C. A., et al., *Adv. Mater.* 2006, 18, 582-586; Rivas, B. L., et al., *Inorg. Chem. Commun.* 2007, 10, 151-154; Ramirez, E., et al., *J. Hazard. Mater.* 2011, 192, 432-439; and Tomida, T., et al., *Ind. Eng. Chem. Res.* 2001, 40, 3557-3562) form a broad set of polymer-based reagents that are designed to sequester heavy metal contaminants in water resources that pose a risk to human health (Järup, L. *Br. Med. Bull.* 2003, 68, 167-182). In light of ongoing efforts to improve water quality in parts of the world where potable water is scarce (World Health Organization. *Guidelines for Drinking-water Quality*, 4$^{th}$ ed.; Gutenberg, Malta, 2011), there is a need for novel metal sequestration polymers (Elimelech, M., et al., A. *Science* 2011, 712-717; Shannon, M. A., et al., *Nature* 2008, 452, 301-310; and Hartono, M. R., et al., *Water Air Soil Pollut.* 2015, 226, 1-11) that are chemically flexible for performance optimization in both the solid and/or solution state.

SUMMARY OF THE INVENTION

In one aspect, the present invention provides compounds that are useful to treat water contaminated with heavy metals. Accordingly, the invention provides a polymer comprising two or more residues of formula III or a salt thereof:

III wherein:
each dash line is independently a single bond or a double bond;
L is $(C_1-C_6)$alkylene, $(C_2-C_6)$alkenylene, $(C_2-C_6)$alkynylene or arylene, wherein one or more carbon atoms in the alkylene, alkenylene and alkynylene is optionally replaced by —O—, —NH— or —S—, and wherein the alkylene, alkenylene, alkynylene and arylene are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;

Q is $(C_1-C_6)$alkyl, $(C_2-C_6)$alkenyl, $(C_2-C_6)$alkynyl or aryl and wherein the alkyl, alkenyl, alkynyl and aryl are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;

R$^a$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^b$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^c$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^d$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

each R$^3$ is independently hydrogen or $(C_1-C_6)$alkyl; and
n is 0, 1 or 2.

The invention also provides processes and intermediates disclosed herein that are useful for preparing a polymer of the invention.

The invention also provides a method for separating a metal from a solution that comprises the metal comprising contacting the solution with a polymer of the invention under conditions whereby the metal associates with the polymer to form a polymer associated metal.

DETAILED DESCRIPTION

The following definitions are used, unless otherwise described: halo is fluoro, chloro, bromo, or iodo.

The term "alkyl", by itself or as part of another substituent, means, unless otherwise stated, a straight or branched chain hydrocarbon radical, having the number of carbon atoms designated (i.e., $C_{1-6}$ means one to six carbons). The term "alkenyl" refers to an unsaturated alkyl radical having one or more double bonds. Similarly, the term "alkynyl" refers to an unsaturated alkyl radical having one or more triple bonds. The term "haloalkyl" or hydroxyalkyl" means an alkyl that is optionally substituted with halo or hydroxyl. The term "alkoxy" refers to an alkyl groups attached to the remainder of the molecule via an oxygen atom ("oxy").

The term "aryl" as used herein refers to a single all carbon aromatic ring or a multiple condensed all carbon ring system wherein at least one of the rings is aromatic. For example, in certain embodiments, an aryl group has 6 to 20 carbon atoms, 6 to 14 carbon atoms, 6 to 12 carbon atoms, or 6 to 10 carbon atoms. Aryl includes a phenyl radical. Aryl also includes multiple condensed ring systems (e.g., ring systems comprising 2, 3 or 4 rings) having about 9 to 20 carbon atoms in which at least one ring is aromatic and wherein the other rings may be aromatic or not aromatic (i.e., cycloalkyl. Such multiple condensed ring systems are optionally substituted with one or more (e.g., 1, 2 or 3) oxo groups on any carbocycle portion of the multiple condensed ring system. The rings of the multiple condensed ring system can be connected to each other via fused, spiro and bridged bonds when allowed by valency requirements. It is to be understood that the point of attachment of a multiple condensed ring system, as defined above, can be at any position of the ring system including an aromatic or a carbocycle portion of the ring. Non-limiting examples of aryl groups include, but are not limited to, phenyl, indenyl, indanyl, naphthyl, 1, 2, 3, 4-tetrahydronaphthyl, anthracenyl, and the like.

The term "alkylene" means a divalent radical derived from an alkane (including branched alkane), as exemplified by —$CH_2CH_2CH_2CH_2$— and —$CH(CH_2)CH_2CH_2$—. "Alkenylene" and "alkynylene" refer to the unsaturated forms of "alkylene" having double or triple bonds, respectively. The term "arylene" means a divalent radical derived from an arene, such as phenylene. "Alkylene", "alkenylene", "alkynylene" and "arylene" are also meant to include mono and poly-halogenated variants.

The term "alkali metal" means the chemical elements found in Group 1 of the periodic table, such as lithium, sodium, potassium, rubidium and cesium. The term "alkali earth metal" means the chemical elements found in Group 2 of the periodic table, such as beryllium, magnesium, calcium, strontium, barium and radium.

The term "Lawesson's reagent" means 2,4-Bis(4-methoxyphenyl)-1,3,2,4-dithiadiphosphetane-2,4-dithione, which is a mild and convenient thionating agent for ketones, esters, and amides that allows the preparation of thioketones, thionoesters and thioamides.

It will be appreciated by those skilled in the art that polymers of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase.

When a bond in a compound formula herein is drawn in a non-stereochemical manner (e.g. flat), the atom to which the bond is attached includes all stereochemical possibilities. When a bond in a compound formula herein is drawn in a defined stereochemical manner (e.g. bold, bold-wedge, dashed or dashed-wedge), it is to be understood that the atom to which the stereochemical bond is attached is enriched in the relative stereoisomer depicted unless otherwise noted. In one embodiment, the compound may be at least 51% the relative stereoisomer depicted. In another embodiment, the compound may be at least 60% the relative stereoisomer depicted. In another embodiment, the compound may be at least 80% the relative stereoisomer depicted. In another embodiment, the compound may be at least 90% the relative stereoisomer depicted. In another embodiment, the compound may be at least 95 the relative stereoisomer depicted. In another embodiment, the compound may be at least 99% the relative stereoisomer depicted.

Specific values listed below for radicals, substituents, and ranges, are for illustration only; they do not exclude other defined values or other values within defined ranges for the radicals and substituents

Specifically, ($C_1$-$C_6$)alkyl can be methyl, ethyl, propyl, isopropyl, butyl, iso-butyl, sec-butyl, pentyl, 3-pentyl, or hexyl; ($C_1$-$C_6$)alkoxy can be methoxy, ethoxy, propoxy, isopropoxy, butoxy, iso-butoxy, sec-butoxy, pentoxy, 3-pentoxy, or hexyloxy; ($C_2$-$C_6$)alkenyl can be vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl; ($C_2$-$C_6$) alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; ($C_1$-$C_6$)haloalkyl can be iodomethyl, bromomethyl, chloromethyl, fluoromethyl, trifluoromethyl, 2-chloroethyl, 2-fluoroethyl, 2,2,2-trifluoroethyl, or pentafluoroethyl; hydroxy($C_1$-$C_6$)alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl; and aryl can be phenyl, indenyl, or naphthyl.

It is understood that when n is 0, the residue of formula III has the following formula IIIa:

or a salt thereof.

It is understood that when n is 1, the residue of formula III has the following formula IIIb:

or a salt thereof.

It is understood that when n is 2, the residue of formula III has the following formula IIIc:

or a salt thereof.

In one embodiment, a residue of the polymer has the following formula IV:

or a salt thereof, wherein:

X is —S—, —O— or —NH—;
Y is —S—, —O—, —NH— or —CH$_2$—;
R$^1$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$; and

R$^2$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$.

In one embodiment, a residue of the polymer has the following formula V:

or a salt thereof.

In one embodiment, R$^1$ is hydrogen or (C$_1$-C$_6$)alkyl.
In one embodiment, R$^1$ is hydrogen or methyl.
In one embodiment, R$^2$ is hydrogen or (C$_1$-C$_6$)alkyl.
In one embodiment, R$^2$ is hydrogen or methyl.
In one embodiment, each dash line is a double bond.
In one embodiment, R$^a$ is hydrogen,
In one embodiment, R$^b$ is hydrogen.
In one embodiment, R$^c$ is hydrogen.
In one embodiment, R$^d$ is hydrogen.
In one embodiment, each residue of the polymer is independently selected from the group consisting of:

-continued and salts thereof.

In one embodiment, each residue of the polymer is independently selected from the group consisting of:

In one embodiment, one or more residues of the polymer are

In one embodiment, the polymer of the invention further comprises a residue that is copolymerized from a monomer selected from the group consisting of:

Processes for preparing a polymer comprising a residue of formula III are provided as further embodiments of the invention and are illustrated by the following procedures in which the meanings of the generic radicals are as given above unless otherwise qualified.

An intermediate useful for preparing a polymer comprising two or more residues of formula III or a salt thereof, is a polymer comprising a residue of the following formula I:

wherein:

L is $(C_1-C_6)$alkylene, $(C_2-C_6)$alkenylene, $(C_2-C_6)$alkynylene or arylene, wherein one or more carbon atoms (e.g. 1, 2, or 3) in the alkylene, alkenylene and alkynylene is optionally replaced by —O—, —NH— or —S—, and wherein the alkylene, alkenylene, alkynylene and arylene are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—R$^3$, —N(R$^3$)—C(O)—R$^3$ or —N(R$^3$)—C(O)—N(R$^3$)$_2$;

Q is $(C_1-C_6)$alkyl, $(C_2-C_6)$alkenyl, $(C_2-C_6)$alkynyl or aryl and wherein the alkyl, alkenyl, alkynyl and aryl are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;

R$^a$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^b$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^c$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^d$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^3$ is independently hydrogen or $(C_1-C_6)$alkyl; and n is 0, 1 or 2.

In one aspect, the invention provides a method to prepare a polymer comprising a residue of formula I or a salt thereof, comprising converting a corresponding polymer comprising a residue of formula Ia:

to provide the polymer comprising a residue of formula I or a salt thereof, wherein:

L is $(C_1-C_6)$alkylene, $(C_2-C_6)$alkenylene, $(C_2-C_6)$alkynylene or arylene, wherein one or more carbon atoms in the alkylene, alkenylene and alkynylene is optionally replaced by —O—, —NH— or —S—, and wherein the alkylene, alkenylene, alkynylene and arylene are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;

Q is $(C_1-C_6)$alkyl, $(C_2-C_6)$alkenyl, $(C_2-C_6)$alkynyl or aryl and wherein the alkyl, alkenyl, alkynyl and aryl are optionally substituted by one or more groups selected from halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;

Z is —O—R$^{3a}$, —S—R$^{3a}$ or —N(R$^{3a}$)$_2$

R$^a$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^b$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^c$ is selected from the group consisting of hydrogen, halo, hydroxy, $(C_1-C_6)$alkyl, $(C_2-C_6)$alkenyl, $(C_2-C_6)$alkynyl, $(C_1-C_6)$haloalkyl, $(C_1-C_6)$alkoxy, hydroxy$(C_1-C_6)$alkyl, —NO$_2$, —N(R$^3$)$_2$, —CN, —C(O)—N(R$^3$)$_2$, —O—R$^3$,

—S—R³, —O—C(O)—R³, —C(O)—R³, —C(O)—OR³, —N(R³)—C(O)—R³ and —N(R³)—C(O)—N(R³)₂;

R$^d$ is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

each R³ is independently hydrogen or (C₁-C₆)alkyl;
each R$^{3a}$ is independently (C₁-C₆)alkyl; and
n is 0, 1 or 2.

In one embodiment, the polymer comprising a residue of formula I is a salt with an alkali metal or an alkali earth metal.

In one embodiment, the method comprises saponifying the polymer comprising a residue of formula Ia by using MOH or M(OH)₂ to provide a corresponding polymer comprising a residue of formula Ig:

wherein M is an alkali metal or an alkali earth metal.

In one embodiment, the method further comprises preparing the polymer comprising a residue of formula Ia by converting a corresponding compound of formula Ib:

to provide the polymer comprising a residue of formula Ia.

In one embodiment, the compound of formula Ib is treated with a transition metal catalyst to provide the corresponding polymer comprising a residue of formula Ia.

In one embodiment, the transition metal catalyst is 1$^{st}$, 2$^{nd}$ or 3$^{rd}$ Generation of Grubbs' catalyst.

In one embodiment, the ratio of compound of formula Ib to Grubbs' catalyst is about 100-800 to 1.

In one embodiment, the method further comprises preparing the compound of formula Ib by contacting a corresponding compound of formula Ic and a corresponding compound of formula Id:

to provide the compound of formula Ib.

In one embodiment, a mixture of the compound of formula Ic and the compound of formula Id is heated to provide the corresponding compound of formula Ib.

In one embodiment, the method further comprises separating the corresponding product of formula Ib by crystallization.

In one embodiment, the method further preparing the compound of formula Ic by converting a corresponding compound of formula Ie:

to provide the compound of formula Ic.

In one embodiment, the compound of formula Ie is treated with P₄S₁₀/hexamethyldisiloxane (HMDO) or Lawesson's reagent to provide the corresponding compound of formula Ic.

In another embodiment, the method further comprises converting the polymer comprising a residue of formula I or a salt thereof to a corresponding polymer comprising a residue of formula III:

or a salt thereof, wherein:
each dash line is independently a single bond or a double bond; provided that at least one dash line is a single bond.

Another intermediate useful for preparing the polymer comprising two or more residues of formula IV or a salt thereof, is a polymer comprising a residue of the following formula II:

II

[Structure diagram of formula II showing polymer with Ra, Rb, Rc, Rd substituents, R1, S, Y, R2, H-X, and HO-C(=O) groups]

wherein:

X is —S—, —O— or —NH—;

Y is —S—, —O—, —NH— or —CH$_2$—;

R$^1$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^2$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^a$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^b$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^c$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^d$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^3$ is independently hydrogen or (C$_1$-C$_6$)alkyl; and n is 0, 1 or 2.

In one aspect, the invention provides a method to prepare a polymer comprising a residue of formula II or a salt thereof, comprising converting a corresponding polymer comprising a residue of formula IIa:

II

[Structure diagram of formula II]

IIa

[Structure diagram of formula IIa]

to provide the polymer comprising a residue of formula II or a salt thereof, wherein:

X is —S—, —O— or —NH—;

Y is —S—, —O—, —NH— or —CH$_2$—;

R$^1$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^2$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^a$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^b$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^c$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^d$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;

R$^3$ is independently hydrogen or (C$_1$-C$_6$)alkyl; and n is 0, 1 or 2.

In one embodiment, the polymer comprising a residue of formula II is a salt with an alkali metal or an alkali earth metal.

In one embodiment, the method comprises saponifying the polymer comprising a residue of formula IIa by using MOH or M(OH)$_2$ to provide a corresponding polymer comprising a residue of formula IIg:

IIg wherein M is an alkali metal or an alkali earth metal.

In one embodiment the method further comprises preparing the polymer comprising a residue of formula IIa by converting a corresponding compound of formula IIb:

IIb to provide the polymer comprising a residue of formula IIa.

In one embodiment, the compound of formula IIb is treated with a transition metal catalyst to provide the corresponding compound of formula IIa.

In one embodiment the transition metal catalyst is 1$^{st}$, 2$^{nd}$ or 3$^{rd}$ Generation of Grubbs' catalyst.

In one embodiment the ratio of compound of formula IIb to Grubbs' catalyst is about 100-800 to 1.

In one embodiment the method further comprises preparing the compound of formula IIb by contacting a corresponding compound of formula IIc and a corresponding compound of formula IId:

IIc

IId to provide the compound of formula IIb.

In one embodiment, a mixture of the compound of formula IIc and the compound of formula IId is heated to provide the corresponding compound of formula IIb.

In one embodiment, the method further comprises separating the corresponding product of formula IIb by crystallization.

In one embodiment, the method further comprises preparing the compound of formula IIc by converting a corresponding compound of formula IIe:

IIe to the compound of formula IIc.

In one embodiment, the compound of formula IIe is treated with P$_4$S$_{10}$/hexamethyldisiloxane (HMDO) or Lawesson's reagent to provide the corresponding compound of formula IIc.

The invention also provides a method of separating a metal from a solution that comprises the metal comprising contacting the solution with a polymer under conditions whereby the metal associates with the polymer to form a polymer associated metal.

In one embodiment, the polymer associates with the metal by chelation.

In one embodiment, the polymer is a part of a membrane, coated on the surface of a bead or is form into a bead.

In one embodiment, the membrane is part of a spiral wound module or present on the surface of porous hollow fibers.

In one embodiment, the metal is lead, mercury, cadmium, chromium, arsenic, gold, manganese, selenium, silver, thallium or silver.

In one embodiment, the method further comprises separating the polymer associated with the metal from the solution.

In one embodiment, the method further comprises separating the polymer associated with the metal from the solution by filtration.

In one embodiment, the method further comprises releasing the metal from the polymer.

The invention will now be illustrated by the following non-limiting Examples.

Example 1. Preparation of Polychelatogen 5

Step 1. Preparation of (3S,6S)-3,6-dimethyl-5-thioxo-1,4-dioxan-2-one (1)

A pressure vessel (equipped with a sidearm and stir bar) was charged with L-lactide (10.00 g, 69.40 mmol), $P_4S_{10}$ (7.71 g, 17.35 mmol) and hexamethyldisiloxane (18.81 g, 115.87 mmol) in ca. 70 mL of anhydrous toluene. After refluxing the contents for 24 h, the reaction was cooled to room temperature and the solvent removed under reduced pressure. The residue was taken up in DCM and passed through a silica column (Sorbtech silica gel; porosity, 60 Å; particle size, 40-60 μm; column, 4 cm diameter, 15 cm length, $R_f$=1.0) to remove sulfur impurities. The crude product was then passed through a second silica column (diameter, 4 cm; length, 15 cm) using a diethyl ether/hexane solvent mixture (25/75) as the eluent ($R_f$=0.45). After solvent removal, the yellow solid was recrystallized thrice from cold diethyl ether (ca. −20° C.) and sublimed to afford analytically pure product (2.00 g, Yield: 18%). $^1$H NMR (500 MHz, $CDCl_3$): δ=5.04 (q, $^3J_{HH}$=13.41, $^3J_{HH}$=6.73, 1H), 4.96 (q, $^3J_{HH}$=12.77, $^3J_{HH}$=6.41, 1H), 1.76 (d, $^3J_{HH}$=6.40, 3H), 1.73 (d, $^3J_{HH}$=6.68, 3H). $^{13}$C NMR (125 MHz, $CDCl_3$): δ 211.4, 167.5, 78.4, 75.1, 19.3, 15.5. IR: ν=2996, 1759, 1441, 1370, 1350, 1323, 1303, 1259, 1226, 1147, 1080, 1063, 1035, 1010, 959, 833, 751, 727 $cm^{-1}$. $[α]_n^{23}$=−512.9 (c 0.59, $CHCl_3$). Melting point: 82-83° C. Anal. Calc. for $C_6H_8O_3S$: C, 44.99; H, 5.03; N, 0.00. Found: C, 45.13; H, 4.99; N, 0.00.

Step 2. Preparation of (1S,2S,3'S,4R,6'S)-3',6'-dimethyl-3-thiaspiro[bicyclo[2.2.1]heptane-2,2'-[1,4]dioxan]-5-en-5'-one (2)

A pressure vessel (equipped with a sidearm and stir bar) was charged with 1 (1.40 g, 8.74 mmol) and freshly distilled cyclopentadiene (2.90 g, 43.72 mmol, 5 equiv) in 10 mL of anhydrous benzene and heated to 130° C. for 5 h. After cooling to room temperature, both solvent and excess cyclopentadiene were removed by reduced pressure and the residue passed through a silica gel column using a diethyl ether/hexane solvent mixture (5/95) as the eluent ($R_f$=0.6). Compound 2 was isolated from its mixture of stereoisomers by recrystallization from boiling hexanes (thrice) to afford a white solid (0.50 g, Yield: 18%). $^1$H NMR (500 MHz, $CDCl_3$): δ=6.60 (q, $^3J_{HH}$=5.71, $^3J_{HH}$=2.77, 1H), 5.93 (q, $^3J_{HH}$=5.62, $^3J_{HH}$=3.21, 1H), 4.71 (q, $^3J_{HH}$=13.99, $^3J_{HH}$=7.01, 1H), 4.21 (m, 2H), 3.16 (d, $^3J_{HH}$=1.72, 1H), 2.23 (d, $^3J_{HH}$=9.42, 1H), 1.91 (m, 1H), 1.56 (m, 6H). $^{13}$C NMR (125 MHz, $CDCl_3$): δ 169.8, 143.2, 129.5, 102.1, 83.3, 71.9, 54.1, 52.7, 51.6, 19.7, 18.1. IR: ν=2990, 2935, 1737, 1441, 1375, 1332, 1269, 1228, 1182, 1153, 1124, 1107, 1078, 1046, 1011, 980, 970, 958, 909, 884, 812, 798, 761, 733, 691 $cm^{-1}$. Melting point: 103-104° C. Anal. Calc. for $C_{11}H_{14}O_3S$: C, 58.39; H, 6.24; N, 0.0. Found: C, 58.46; H, 6.11; N, 0.00. The stereochemistry of compound 2 was confirmed by X-ray crystal structure.

Step 3. Preparation of Compound 3

Thia-Diels-Alder adduct 2 (20 mg, 0.0884 mmol) was added to 2 mL aq. NaOH solution (4 mg, 0.0972 mmol, 1.1 equiv) and stirred overnight at room temperature where it eventually dissolved. The solution was then filtered through a 0.2 μm syringe filter and the solvent removed to afford a white solid. $^1$H NMR (500 MHz, $D_2O$): δ=6.53 (q, $^3J_{HH}$=5.56, $^3J_{HH}$=2.65, 1H), 6.11 (q, $^3J_{HH}$=5.50, $^3J_{HH}$=3.33, 1H), 4.53 (q, $^3J_{HH}$=13.89, $^3J_{HH}$=6.95, 1H), 4.24 (s, 1H), 3.47 (d, $^3J_{HH}$=13.11, $^3J_{HH}$=6.56, 1H), 3.20 (s, 1H), 2.10 (d, $^3J_{HH}$=9.63, 1H), 1.86 (d, $^3J_{HH}$=9.68, 1H), 1.34 (m, 6H). $^{13}$C NMR (125 MHz, $CDCl_3$): δ 182.5, 141.2, 132.5, 110.7, 77.0, 75.0, 55.6, 53.3, 50.7, 19.4, 18.2.

Step 4. Preparation of Compound 4

A pressure vessel (equipped with a sidearm and stir bar) was charged with 2 (100 mg, 4.4 mmol) and the appropriate amount of Grubbs $2^{nd}$ generation catalyst (G2) in ca. 2 mL of anhydrous DCM. The reaction was quenched with butyl vinyl ether (10 equiv. wrt (G2)) after consumption of the monomer was complete (as determined by $^1$H NMR spectroscopy). Compound 4 was then precipitated upon dropwise addition of the reaction solution into cold (ca. 0° C.) methanol. After dissolving and precipitating the polymer in triplicate, the polymer was dried under vacuum for 24 h. Compound 4: ($[2]_0/[G2]_0=100$). $^1$H NMR (500 MHz, CDCl$_3$): δ=7.36 (br s, 5H), 5.81–5.65 (br m, 217H), 4.70 (br s, 105H), 4.53–4.11 (br m, 221H), 3.15–2.84 (br m, 219H), 1.75 (br s, 107H), 1.55–1.42 (br m, 640H).

Step 5. Preparation of Compound 5

A solution of 4 ($[2]_0/[G2]_0=100$, 50 mg in 5 mL THF) was added to 5 mL of 1 M NaOH (aq) and stirred for 48 h at room temperature. The solution was concentrated under reduced pressure and dialyzed against a 3500 $M_w$ cutoff in deionized water for 48 h under sink conditions. The solvent was removed by reduced pressure and the white solid dried under vacuum for 24 h (52 mg). $^1$H NMR (500 MHz, D$_2$O): δ=5.77–5.66 (br m, 2H), 4.389 (br s, 1H), 4.13–4.09 (br m, 1H), 3.85 (br s, 1H), 3.34 (br, s, 1H), 3.02 (br s, 1H), 2.17 (br s, 1H), 1.92 (br s, 1H), 1.44–1.28 (br m, 5H).

Example 2. Heavy Metal Affinity Test

Compound 5 can be used with a commercially available centrifuge tube equipped with a cellulose membrane to extract Pb$^{2+}$ from water. To investigate the liquid-phase polymer-based retention (LPR) of Pb$^{2+}$, aqueous solutions of compound 5 (2 mL, [5]=ca. 1 mg/mL) and Pb$^{2+}$ (1 mL, [Pb$^{2+}$]=ca. 30 ppm) were combined ([5], ca. 0.67 mg/mL; [Pb$^{2+}$]$_0$, ca. 10 ppm) and stirred under ambient conditions for 90 min followed by centrifugation through an Amicon Ultra filter equipped with a regenerated cellulose membrane (3 kDa MWCO). Filtrate analysis by atomic absorption spectroscopy revealed no detectable Pb$^{2+}$ in these solutions, even after several retentate washes (e.g., 5×3 mL) with deionized water. Indeed, filtrates from control experiments employing polymer-free solutions were found to possess Pb$^{2+}$ concentrations of ca. 9.57±0.08 ppm indicating that the cellulose membrane did not play a significant role in Pb$^{2+}$ binding. As anticipated from earlier results, washing the membrane with three aliquots of 1 M HCl (3 mL) afforded filtrates with [Pb$^{2+}$] of 7.09, 1.63, and 0.21 ppm respectively indicating that Pb$^{2+}$ can be released from the polymer upon treatment with aqueous acid.

Figure 1:
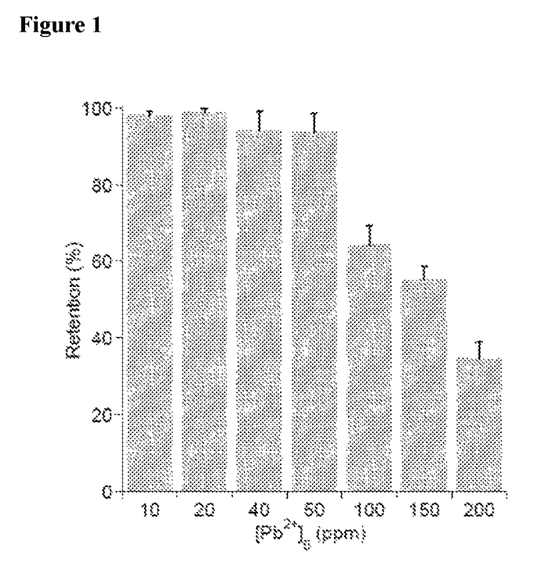
FIG. 1 shows retention (%) of Pb$^{2+}$ as a function of [Pb$^{2+}$]$_0$. Data is reported as a mean with standard deviation (n=3). [5]=0.033 mg/mL, pH=ca. 6.
Figure 2:
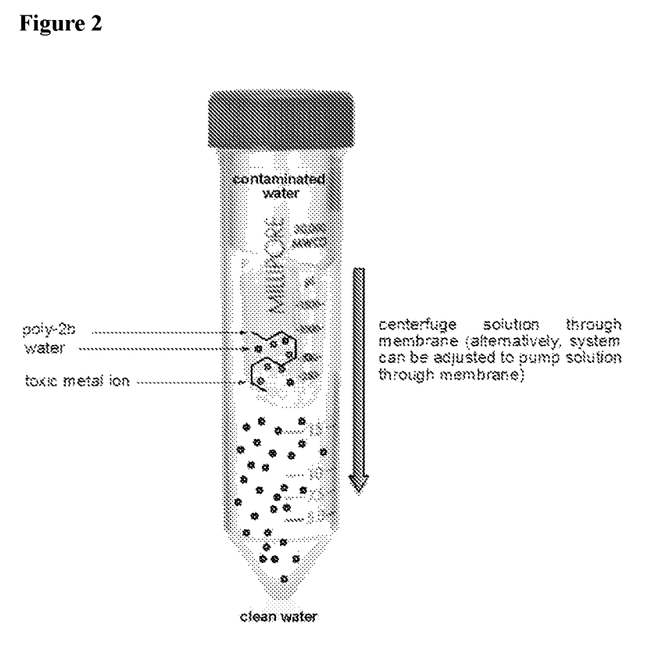
FIG. 2 shows schematic representation of how poly-2b can be used with a commercially available centrifuge tube equipped with a cellulose membrane to extract Pb$^{2+}$ from water.
Figure 3:
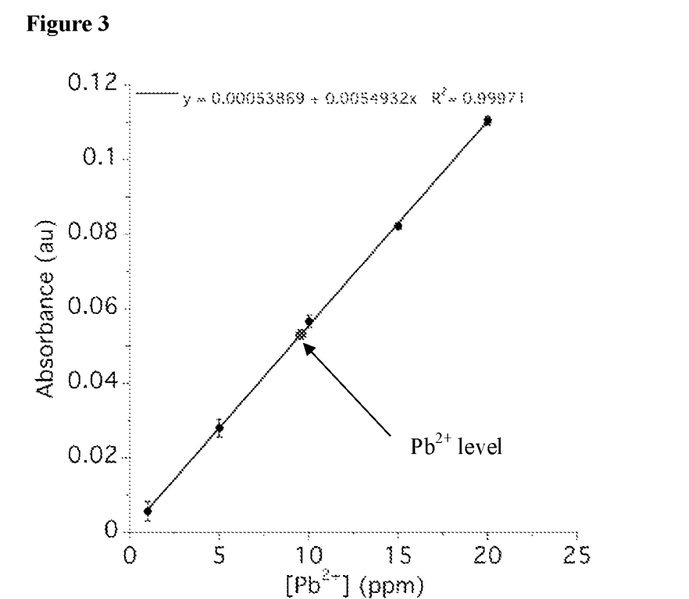
FIG. 3 shows AA spectroscopy results from control experiments. An aqueous solution of lead ions ([Pb$^{2+}$]$_0$, ca. 10 ppm) was passed through the cellulose filter. The dot labeled by arrow represents [Pb$^{2+}$] in the filtrate. Experiments performed in triplicate. Data suggests that the cellulose membrane does NOT participate in lead extraction to a significant extent.
Figure 4:
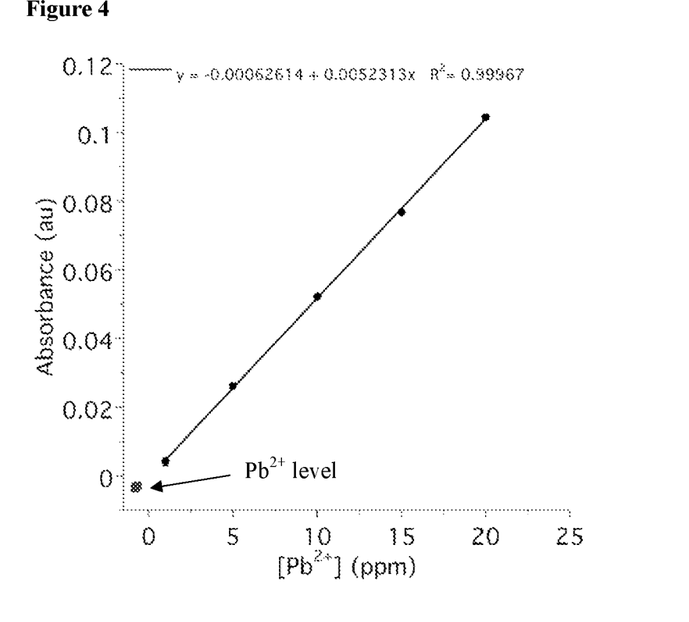
FIG. 4 shows AA spectroscopy results from poly-2b Pb$^{2+}$-binding experiments. An aqueous solution of lead ions ([Pb$^{2+}$]$_0$, ca. 10 ppm) and poly-2b ([poly-2b]=0.67 mg/mL) was passed through the cellulose filter. The dot labeled by arrow represents [$Pb^{2+}$] in the filtrate. Experiments performed in triplicate. Data suggests that there is no detectable lead (according to the lower detection limit of our AA spectrometer) in the filtrate.
Figure 5:
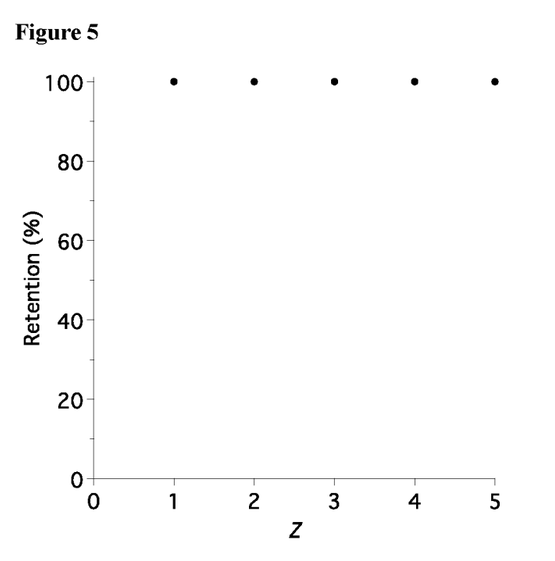
FIG. 5 shows retention profile plotted against filtration factor Z where $Z=V_f V_0^{-1}$ ($V_f$=volume of filtrate and $V_0$=volume of cell. Data suggests that poly-2b holds onto $Pb^{2+}$ even after several washes with pure deionized water.

To gain further insight into Pb$^{2+}$ uptake by compound 5, Pb$^{2+}$ retention (%) was measured as a function of the initial Pb$^{2+}$ concentration [Pb$^{2+}$]$_0$ (FIG. 1). Indeed, a near quantitative retention of Pb$^{2+}$ by the polychelatogen ([5]=ca. 0.033 mg/mL). pH=ca. 6, n=3) in solutions up to [Pb$^{2+}$] ca. 50 ppm was observed, after which the Pb$^{2+}$ retention drops considerably. Be that as it may, the binding capacity Pb$^{2+}$ in milligrams per gram of compound 5 at [Pb$^{2-}$]$_0$=100 ppm is ca. 1925.3±148.9 mg (Pb$^{2+}$)/g (5), a value that is considerably higher than many Pb$^{2+}$ binding systems reported to date (Spivakov, B. Y., et al., Nature 1985, 315, 313-315; Geckeler, K. E., et al., Angew. Makromol. Chem. 1987, 155, 151-161; Tülü, M., et al., Appl. Polym. Sci. 2008, 109, 2808-2814; and Alexandratos, S. D., et al., Macromolecules 2001, 34, 206-210) Moreover, [5] concentrations could be increased to promote the near quantitative retention of Pb$^{2+}$ from solutions of ca. [Pb$^{2+}$]$_0$=100 ppm, indicating that the LPR system can be optimized to enhance performance. In solutions with [Pb$^{2+}$]$_0$=150 and 200 ppm, the Pb$^{2+}$ binding capacity was determined to be 2481.9±158.4 and 2084.6±255.5 mg (Pb$^{2+}$)/g (5) respectively, indicating that the Langmuir adsorption model that predicts a plateau may not be applicable due to the homogenous nature of the binding process (Madadrang, C. J., et al., ACS Appl. Mater. Interfaces 2012, 4, 1186-1193).

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A polymer comprising two or more residues of formula III or a salt thereof:

wherein:
each dash line is independently a single bond or a double bond;
L is (C$_1$-C$_6$)alkylene, (C$_2$-C$_6$)alkenylene, (C$_2$-C$_6$)alkynylene or arylene, wherein one or more carbon atoms in the alkylene, alkenylene and alkynylene is optionally replaced by —O—, —NH— or —S—, and wherein the alkylene, alkenylene, alkynylene and arylene are optionally substituted by one or more groups selected from halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy (C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;
Q is (C$_1$-C$_6$)alkyl, (C$_2$-C$_6$)alkenyl, (C$_2$-C$_6$)alkynyl or aryl and wherein the alkyl, alkenyl, alkynyl and aryl are optionally substituted by one or more groups selected from halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy (C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ or —N(R$^3$)—C(O)—N(R$^3$)$_2$;
R$^a$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$, —O—R$^3$, —S—R$^3$, —O—C(O)—R$^3$, —C(O)—R$^3$, —C(O)—OR$^3$, —N(R$^3$)—C(O)—R$^3$ and —N(R$^3$)—C(O)—N(R$^3$)$_2$;
R$^b$ is selected from the group consisting of hydrogen, halo, hydroxy, (C$_1$-C$_6$)alkyl, (C$_2$-C$_6$)alkenyl, (C$_2$-C$_6$)alkynyl, (C$_1$-C$_6$)haloalkyl, (C$_1$-C$_6$)alkoxy, hydroxy(C$_1$-C$_6$)alkyl, —NO$_2$, —N(R$^3$)$_2$, —CN, —C(O)—N(R$^3$)$_2$,

—O—R³, —S—R³, —O—C(O)—R³, —C(O)—R³, —C(O)—OR³, —N(R³)—C(O)—R³ and —N(R³)—C(O)—N(R³)₂;

R^c is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

R^d is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

each R³ is independently hydrogen or (C₁-C₆)alkyl; and n is 1.

2. The polymer of claim 1, wherein the residue has the following formula IIIb:

or a salt thereof.

3. The polymer of claim 1, wherein the residue has the following formula IV:

or a salt thereof, wherein:

X is —S—, —O— or —NH—;
Y is —S—, —O—, —NH— or —CH₂—;
R¹ is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂; and
R² is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂.

4. The polymer of claim 3, wherein the residue has the following formula V:

or a salt thereof.

5. The polymer of claim 1, wherein each residue is independently selected from the group consisting of:

and salts thereof.

6. A method to prepare a polymer as described in claim 1, comprising, converting a corresponding polymer comprising a residue of formula Ia:

Ia to provide the polymer comprising a residue of formula I or a salt thereof, wherein:
Z is —O—$R^{3a}$, —S—$R^{3a}$ or —N($R^{3a}$)$_2$; and
each $R^{3a}$ is independently ($C_1$-$C_6$)alkyl.

7. The method of claim 6, further comprising preparing the polymer comprising a residue of formula Ia by converting a corresponding compound of formula Ib:

Ib to provide the polymer comprising a residue of formula Ia.

8. The method of claim 7, further comprising preparing the compound of formula Ib by contacting a corresponding compound of formula Ic and a corresponding compound of formula Id:

Ic

Id to provide the compound of formula Ib.

9. The method of claim 8, further comprising preparing the compound of formula Ic by converting a corresponding compound of formula Ie:

Ie to provide the compound of formula Ic.

10. The method of claim 6, further comprising converting the polymer comprising a residue of formula I or a salt thereof to a corresponding polymer comprising a residue of formula III:

III or a salt thereof, wherein:
each dash line is independently a single bond or a double bond; provided that at least one dash line is a single bond.

11. A method to prepare a polymer comprising a residue of formula II or a salt thereof, comprising converting a corresponding polymer comprising a residue of formula IIa:

II

IIa to provide the polymer comprising a residue of formula II or a salt thereof, wherein:
X is —S—, —O— or —NH—;
Y is —S—, —O—, —NH— or —$CH_2$—;
$R^1$ is selected from the group consisting of hydrogen, halo, hydroxy, ($C_1$-$C_6$)alkyl, ($C_2$-$C_6$)alkenyl, ($C_2$-$C_6$)alkynyl, ($C_1$-$C_6$)haloalkyl, ($C_1$-$C_6$)alkoxy, hydroxy($C_1$-$C_6$)alkyl, —$NO_2$, —N($R^3$)$_2$, —CN, —C(O)—N($R^3$)$_2$, —O—$R^3$, —S—$R^3$, —O—C(O)—$R^3$, —C(O)—$R^3$, —C(O)—$OR^3$, —N($R^3$)—C(O)—$R^3$ and —N($R^3$)—C(O)—N($R^3$)$_2$;
$R^2$ is selected from the group consisting of hydrogen, halo, hydroxy, ($C_1$-$C_6$)alkyl, ($C_2$-$C_6$)alkenyl, ($C_2$-$C_6$)alkynyl, ($C_1$-$C_6$)haloalkyl, ($C_1$-$C_6$)alkoxy, hydroxy($C_1$-$C_6$)alkyl, —$NO_2$, —N($R^3$)$_2$, —CN, —C(O)—N($R^3$)$_2$, —O—$R^3$, —S—$R^3$, —O—C(O)—$R^3$, —C(O)—$R^3$, —C(O)—$OR^3$, —N($R^3$)—C(O)—$R^3$ and —N($R^3$)—C(O)—N($R^3$)$_2$;
$R^a$ is selected from the group consisting of hydrogen, halo, hydroxy, ($C_1$-$C_6$)alkyl, ($C_2$-$C_6$)alkenyl, ($C_2$-$C_6$)alkynyl, ($C_1$-$C_6$)haloalkyl, ($C_1$-$C_6$)alkoxy, hydroxy($C_1$-$C_6$)alkyl, —$NO_2$, —N($R^3$)$_2$, —CN, —C(O)—N($R^3$)$_2$, —O—R³, —S—R³, —O—C(O)—R³, —C(O)—R³, —C(O)—OR³, —N(R³)—C(O)—R³ and —N(R³)—C(O)—N(R³)₂;

$R^b$ is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

$R^c$ is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

$R^d$ is selected from the group consisting of hydrogen, halo, hydroxy, (C₁-C₆)alkyl, (C₂-C₆)alkenyl, (C₂-C₆)alkynyl, (C₁-C₆)haloalkyl, (C₁-C₆)alkoxy, hydroxy(C₁-C₆)alkyl, —NO₂, —N(R³)₂, —CN, —C(O)—N(R³)₂, —O—R³, —S—R³, —O—C(O)—R³, —C(O)—R³, —C(O)—OR³, —N(R³)—C(O)—R³ and —N(R³)—C(O)—N(R³)₂;

R³ is independently hydrogen or (C₁-C₆)alkyl; and n is 1.

12. The method of claim 11, further comprising preparing the polymer comprising a residue of formula IIa by converting a corresponding compound of formula IIb:

IIb to provide the polymer comprising a residue of formula IIa.

13. The method of claim 12, further comprising preparing the compound of formula IIb by contacting a corresponding compound of formula IIc and a corresponding compound of formula IId:

IIc

IId to provide the compound of formula IIb.

14. The method of claim 13, further comprising preparing the compound of formula IIc by converting a corresponding compound of formula IIe:

IIe to provide the compound of formula IIc.

15. The method of claim 1, further comprising converting the polymer comprising a residue of formula II or a salt thereof to a polymer comprising a residue of formula IV:

IV or a salt thereof, wherein:

each dash line is independently a single bond or a double bond; provided that at least one dash line is a single bond.

* * * * *

UNITED STATES PATENT AND TRADEMARK OFFICE
CERTIFICATE OF CORRECTION

PATENT NO. : 10,669,378 B2
APPLICATION NO. : 16/094844
DATED : June 2, 2020
INVENTOR(S) : Agostino Pietrangelo and Anshuman Mangalum Page 1 of 1

It is certified that error appears in the above-identified patent and that said Letters Patent is hereby corrected as shown below:

In the Claims

Column 23, Lines 46-51, Claim 8, please delete " 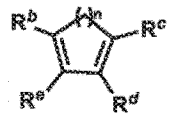 " and insert -- 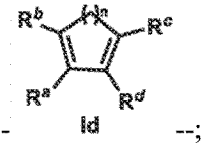 --;

Column 26, Lines 38-48, Claim 15, please delete " 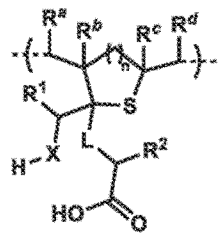 " and insert -- 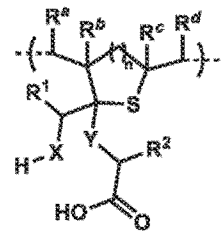 -- therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*